United States Patent Office 3,516,951
Patented June 23, 1970

3,516,951
ROOM TEMPERATURE VULCANIZING SILICONE RUBBER FOAM
Ronald L. Smith, Ballston Lake, N.Y., assignor to General Electric Company, a corporation of New York
No Drawing. Filed Dec. 18, 1967, Ser. No. 691,127
Int. Cl. C08g *31/10, 31/30, 53/08*
U.S. Cl. 260—2.5     7 Claims

ABSTRACT OF THE DISCLOSURE

Room temperature vulcanizing silicone rubber foams stable in the absence of moisture but convertible to cured foams upon exposure to atmospheric moisture are prepared by mixing a fluid organopolysiloxane having silicon-bonded hydrogen atoms with a bis-(trialkylsilyl) acid amide, such as bis-(trimethylsilyl)acetamide and a tin salt of an organic carboxylic acid.

---

This invention relates to room temperature vulcanizing silicone rubber foams.

Silicone foams have been known in the art and have been of two general types. The first type requires the heating of the components of the foam at an elevated temperature both to generate the foam and to cure the foam material. Room temperature vulcanizing silicone rubber foams have been known, but generally these have been two-package materials which require the mixing of the components of the foam at the place of use and foaming is commenced as soon as the components are mixed. While these foams have many satisfactory uses, the fact that the components require mixing on the spot has been a distinct disadvantage.

The present invention is based on my discovery of a new, relatively simple composition which can be mixed and which remains stable for an indefinite period of time in the absence of moisture but which foams and cures upon exposure to atmospheric moisture or deliberately introduced moisture.

The room temperature vulcanizing silicone rubber foam composition of the present invention comprises (1) a fluid organopolysiloxane in which approximately 50% of the silicon atoms contain a silicon-bonded hydrogen group, (2) a bis-(trialkylsilyl) acid amide having the formula:

(1)     $YCON(SiY'_3)_2$ and (3) a tin salt of an organic carboxylic acid, where Y is a member selected from the class consisting of hydrogen, methyl and ethyl, and Y' is a member selected from the class consisting of lower alkyl radicals, e.g., alkyl radicals containing from 1 to 7 carbon atoms.

The compositions of the present invention are prepared by mixing, under anhydrous conditions, the three components listed above, together with any other components to be incorporated into the silicone rubber foam and the resulting mixture is stored under anhydrous conditions until time for use. When the material is to be used, it is placed in the location in which it is to be foamed in place, and atmospheric moisture or deliberately introduced moisture is allowed to come in contact with the material, whereby it foams and cures.

The fluid organopolysiloxanes useful in the practice of my invention are well known in the art and are often referred to as organohydrogenpolysiloxanes. These organohydrogenpolysiloxanes contain from about 0.5 to 1.0 silicon-bonded hydrogen atom per silicon atom with any remaining valences of silicone other than those in the siloxane chain being monovalent hydrocarbon radicals free of aliphatic unsaturation. One of the most common of these materials is methylhydrogenpolysiloxane homopolymers and copolymers containing both methylhydrogensiloxane units and dimethylsiloxane units. Sometimes these materials are chain-stopped with trimethylsiloxy groups and other times the materials are chain-stopped with silanol groups. These organohydrogenpolysiloxane fluids can be described as liquid materials having viscosities in the range of from about 20 centistokes to 10,000 centistokes when measured at 25° C. and having the formula:

(2)     $(R)_a(H)_bSiO_{\frac{4-a-b}{2}}$ where R represents a monovalent hydrocarbon radical free of aliphatic unsaturation, *a* has a value of from 1.0 to 1.6, *b* has a value of from 0.5 to 1.0, and the sum of *a* plus *b* is equal to from 2.0 to 2.1.

These organohydrogenpolysiloxanes are primarily linear materials having viscosities of the order of from about 20 to 10,000 centistokes at 25° C., with the majority of the radicals represented by R being methyl radicals. By majority is meant that generally about 80 to 100 percent of the R groups are methyl groups and, where less than 100 percent of the R groups are methyl groups, the remainder are preferably ethyl or other lower alkyl radicals or phenyl radicals. However, in addition to the methyl, ethyl, and lower alkyl and phenyl radicals within the scope of R of Formula 1, it should be known that the organic radical represented by R can be any of the conventional monovalent hydrocarbon radicals free of aliphatic unsaturation which are commonly associated with siloxanes. Included among such radicals are alkyl radicals, e.g., methyl, ethyl, propyl, butyl, octyl, octadecyl, etc. radicals; monocyclic and polycyclic aryl radicals, e.g., phenyl, naphthyl, xylyl, tolyl, etc. radicals; lower aralkyl radicals, e.g., benzyl, phenylethyl, etc. radicals; cycloaliphatic radicals, e.g., cyclohexyl, cycloheptyl, etc. radicals.

Generally, the organohydrogenpolysiloxane of Formula 2 consists primarily of organohydrogensiloxane units having the formula:

(3)     $(R)(H)SiO$ alone or copolymerized with diorganosiloxane units having the formula:

(4)     $(R)_2SiO$ where R is as previously defined. Preferably, the organohydrogensiloxane units are primarily methylhydrogensiloxane units, but the use of phenylhydrogensiloxane units and other organohydrogensiloxane units is permissible, providing the final organohydrogenpolysiloxane falls within the scope of Formula 2. The preferred siloxane unit within the scope of Formula 4 is the dimethylhydrogensiloxane unit, but conventional and useful materials contain a full gamut of diorganosiloxane units with the various values of R described above. Again, the nature of the diorganosiloxane units and the organohydrogensiloxane units are selected so that the final organohydrogenpolysiloxane fluid is within the scope of Formula 2. It is, of course, possible that the organohydrogenpolysiloxane of Formula 2 contains other than difunctional siloxane units, such as triorganosiloxane units having the formula:

(5)     $(R)_3SiO_{0.5}$ and diorganohydrogensiloxane units having the formula:

(6)     $(R)_2(H)SiO_{0.5}$

It is also possible that trifunctional siloxane units are present in the organohydrogenpolysiloxane. Such trifunctional siloxane units have the formula:

(7)     $(R)SiO_{1.5}$, or $(H)SiO_{1.5}$

Again, the various siloxane units are selected so that the ratio of R groups to silicon and of hydrogen atoms to silicon are within the scope of Formula 2.

The bis-(trialkylsilyl) acid amides of Formula 1 are known in the art and their preparation is described by Klebe, J. F., Finkbeiner, H., and White, D. M., J. Am. Chem. Soc. 88, 3390 (1966). This Klebe et al. article is incorporated by reference into the present application for details of the method of preparation of such acid amides. The preparation briefly involves the reaction of an amide having the formula:

(8) $\quad$ (YCONH$_2$)

with a trialkylchlorosilane having the formula:

(9) $\quad$ ClSiY$'_3$ in the presence of a solvent, such as triethylamine. The reaction is effected by refluxing, filtering the reaction mixture, and then recovering the bis-(trialkylsilyl) acid amide from the reaction mixture by fractional distillation. In the preparation of bis-(trimethylsilyl) acetamide, the reaction involves acetamide and trimethylchlorosilane with triethylamine as the solvent.

While the bis-(trimethylsilyl) acetamide is a preferred amide employed in the practice of the present invention, the full scale of amides useful in the practice of the present invention are those within the scope of Formula 1. Thus, the amides include those in which the silicon atom contains different lower alkyl radicals than methyl and those in which the amide is other than acetamide. For example, typical acid amides within the scope of Formula 1 include bis - (triethylsilyl)propionamide, and bis - (tri - n-heptylsilyl)-formamide.

The tin salts of organic carboxylic acids employed in the practice of the present invention are those tin salts commonly known as silanol condensation catalysts in the silicone art. These materials include simple tin salts, such as tin octoate, as well as salts of organotin compounds, such as the salts of dibutyltin compounds. An illustrative group of tin salts useful in the practice of the present invention includes tin naphthenate, tin - 2 - ethylhexoate, tin octoate, tin sebacate, carbomethoxyphenyl tin trisuberate, isobutyl tin tricerolate, cyclohexenyl tin triaconitate, xenyl tin trisalicylate, dimethyl tin dibutyrate, dibutyl tin diacetate, divinyl tin bis-cyclopentylacetate, dibutyl tin dibenzoate, dibutyl tin di-2-ethylhexoate, dibutyl tin dilaurate, dibutyl tin dimaleate, dibutyl tin diadipate, diisoamyl tin bis-trichlorobenzoate, dibutyl tin diformate, dibutyl tin dilactate, dicyclopentyl tin bis-monochloroacetate, dibenzyl tin di-2-pentenoate, diallyl tin di-2-hexenoate, tributyl tin acetate, triphenyl tin acetate, tricyclohexyl tin acrylate, tritolyl tin terephthalate, tri-n-propyl tin acetate, tristerol tin succinate, trinaphthyl tin cyclohexenyl acetate and triphenyl tin ethylmalonate.

The amount of tin salt useful in the practice of the present invention can vary within extremely wide limits. However, satisfactory results are obtained when the tin salts are present in an amount equal to from about 0.05 to 10 parts by weight per 100 parts by weight of the organohydrogenpolysiloxane fluid.

In addition to the organohydrogenpolysiloxane fluid of Formula 2, the acid amide of Formula 1 and the tin salt of the organic carboxylic acid, the compositions of the present invention can also contain some of the additives present in conventional silicone compounds. These additives include flame retardants, stabilizing agents, plasticizers, compression set additives, pigments, dyes, perfumes, oxidation inhibitors, heat stabilizers, light protectants, antibacterial additives, disinfectants, as well as reinforcing and nonreinforcing fillers.

The fillers commonly employed in silicone rubber stocks can be present in the silicone foams of the present invention. These fillers include the various finely divided silicas, such as fume silica, silica, aerogel, silica hydrogel, precipitated silica, as well as other naturally occurring or manufactured silicas. These silicas can be employed in their untreated state or the surfaces can be treated with various organosilicon compounds. Aside from the silica fillers, other suitable additives include calcium carbonate, diatomaceous earth, quartz flour, aluminum, nickel, and other metal powders, metal oxides, such as titania, iron oxides, aluminum oxides, and zinc oxides. In addition, fibrous fillers, such as glass fibers, asbestos fibers and cotton fibers can also be added. Finally, the compositions of the present invention can include, as a filler, carbon in the form of carbon black or graphite.

In the preferred embodiment of my invention, the silicone foams contain only a minor amount, e.g., up to about 10 parts of fillers and other additives per 100 parts by weight of the organohydrogenpolysiloxane fluid. However, in certain instances, the use of higher amounts, e.g., from 10 to 30 parts of additive, are permissible.

In preparing the foamable organopolysiloxane compositions of the present invention, care must be taken to prepare the foamable compositions under anhydrous conditions, since moisture causes conversion of the foamable compositions to a cured foam. Aside from the maintenance of anhydrous conditions, no special precautions are required in mixing the organohydrogenpolysiloxane fluid, the acid amide and the tin salt catalyst. The components may be added in any convenient order, along with other additives which can be employed in the foamed composition. When the proportions of ingredients are selected to provide 100 parts by weight of the organohydrogenpolysiloxane fluid, from 1 to 10 parts by weight of the acid amide of Formula 1 and from 0.05 to 10 parts of the tin salt, the resulting composition will produce a cured foam having a density of from about 15 to 5 pounds per cubic foot. The foam is obtained by merely mixing the components under anhydrous conditions, placing the foamable composition at the point where the foam is desired, and exposing the foam to moisture until a cured foam is obtained. The time required for conversion of the foamable composition to the cured foam varies with the temperature at which foaming occurs and with the humidity of the environment in which foaming occurs. Thus, in a 50% relative humidity environment at a temperature of 70° F., a typical composition within the present invention foams to the cured state within 24 hours.

The density of the foam is varied by varying the amount of acid amide of Formula 2 in the composition and the temperature and relative humidity of the atmosphere in which curing is to be effected. Thus, with all other things being equal, the density of the foam decreases as the amount of acid amide increases, the density of the foam decreases as the temperature of foaming decreases, and the density of the foam decreases as the relative humidity of the curing environment increases.

The foams produced by the process of the present invention are generally an off-white when the foam products are prepared from only the organohydrogenpolysiloxane fluid, the acid amide and a relatively simple salt, such as dibutyl tin dilaurate. The colors can be varied by using different cross-linking agents or by using different fillers, with a complete range of colors being available. The foams vary in character from soft, flexible foams to fairly rigid and inflexible foams. In general, the character of the foam is varied by the amount of cross-links present in the foamed product. Thus, with all other things being equal, the higher density foams prepared by the process of the present invention are more flexible than the lower density foams. Foams prepared from organohydrogenpolysiloxanes containing higher ratios of hydrogen to silicon tend to be more rigid and less dense than products prepared from lower ratios of hydrogen to silicon. Thus, by varying the components, it is possible to widely vary the properties of the resulting organopolysiloxane foam.

The foams which result from the foaming and curing of the compositions of the present invention upon exposure to moisture can be used for a wide variety of applications, and are especially useful in those applications where stability over a wide temperature range is required.

Thus, these materials are useful for foamed-in-place insulating filling for filled aluminum honeycomb structures which must be used in both arctic regions and desert regions. These foams are useful for interlayer insulation for storage containers which are used to hold liquified gases, such as liquid hydrogen, liquid nitrogen, or liquid oxygen. These foams are also useful for foamed-in-place insulation for building construction subjected to extremes of temperature.

The following examples are illustrative of the practice of my invention and are not intended for purposes of limitation. All parts are by weight.

EXAMPLE 1

Under anhydrous conditions, 5 parts of bis-(trimethylsilyl)-acetamide was mixed into 200 parts of a trimethylsilyl chain-stopped methylhydrogenpolysiloxane having a viscosity of about 50 centistokes at 25° C. and being within the scope of Formula 2 when R is methyl, $a$ is 1.08 and $b$ is 0.96. To this reaction mixture was then added, still under anhydrous conditions, 1 part of dibutyl tin dilaurate. One portion of the reaction mixture was placed in a sealed container and stored for six months, during which time no visible change took place. Another portion of the material was poured into a mold and allowed to stand in a 50% relative humidity, 70° F. environment for 24 hours, during which time the mixture foamed and cured to a fairly rigid silicone rubber foam having a density of 10 pounds per cubic foot. After storage in the sealed container for 6 months, another sample was exposed to the same atmosphere and also cured to a foam having a density of about 10 pounds per cubic foot at the end of 24 hours.

EXAMPLE 2

Under anhydrous conditions, a reaction vessel was charged with 100 parts of a 10,000 centistoke silanol chain-stopped copolymer of dimethysiloxane units, diphenylsiloxane units and methylhydrogensiloxane units, with the various units being present in the ratio of 50 mole percent methylhydrogensiloxane units, 45 mole percent dimethylsiloxane units, and 5 mole percent diphenylsiloxane units to provide an organohydrogenpolysiloxane fluid within the scope of Formula 2 in which R represents a mixture of methyl and phenyl radicals in the ratio of 14 methyl radicals per phenyl radical, $a$ has a value of 1.5 and $b$ has a value of 0.5. To this fluid was added 10 parts of bis-(tri-n-heptylsilyl)-formamide and 5 parts of stannous octoate. A portion of this reaction mixture was allowed to stand in a 50% relative humidity, 70° F. atmosphere for 24 hours, during which time the liquid composition foamed to a flexible, cured silicone foam having a density of about 25 pounds per cubic foot.

EXAMPLE 3

To a reaction vessel, under anhydrous conditions, was added 100 parts of a 300 centistoke copolymer consisting of 1 mole percent dimethylhydrogen chain-stopping units, 49.5 mole percent methylhydrogensiloxane units and 49.5 mole percent dimethylhydrogensiloxane units to provide a fluid organohydrogenpolysiloxane within the scope of Formula 2 in which R is methyl, $a$ has a value of 1.51, and $b$ has a value of 0.50. To this reaction mixture is added one part of bis-(trimethylsilyl)-propionamide, 5 parts of finely divided silica, and 2 parts dibutyl tin diacetate. A portion of this composition was exposed to 50% relative humidity and 70° F. for 24 hours, during which time a foam having a density of 25 pounds per cubic foot was formed.

While the foregoing examples have illustrated a number of embodiments of my invention, it is understood that my invention relates broadly to the class of compositions which are stable in the absence of moisture, but which cure to the foamed silicone state upon exposure to atmospheric moisture and which consist of the organohydrogenpolysiloxane, the bis-(trialkylsilyl)acid amide of the type described in Formula 1 and the tin salt of the organic carboxylic acid.

What I claim as new and desire to secure by Letters Patent of the United States is:

1. An organopolysiloxane composition stable in the absence of moisture and curable to the solid, foam state upon exposure to moisture comprising (A) a fluid organohydrogenpolysiloxane containing from about 0.5 to 1.0 silicon-bonded hydrogen atoms per silicon atom with any remaining valences of silicon other than those in the siloxane chain being selected from the class consisting of monovalent hydrocarbon radicals free of aliphatic unsaturation, said fluid organohydrogenpolysiloxane having a viscosity in the range of from about 20 centistokes to 10,000 centistokes when measured at 25° C., (B) a bis-(trialkylsilyl)-acid amide having the formula:

$$YCON(SiY'_3)_2$$

where Y is a member selected from the class consisting of hydrogen, methyl, and ethyl and Y' is a lower alkyl radical, and (C) a tin salt of an organic carboxylic acid.

2. A composition of claim 1 in which the fluid organohydrogenpolysiloxane has the formula:

$$(R)_a(H)_bSiO_{\frac{4-a-b}{2}}$$

where R is a member selected from the class consisting of monovalent hydrocarbon radicals free of aliphatic unsaturation, $a$ has a value of from 1.0 to 1.6, inclusive, $b$ has a value of from 0.5 to 1.0, inclusive, and the sum of $a$ plus $b$ is equal to from 2.0 to 2.1, inclusive.

3. A composition of claim 2 in which R is methyl.

4. A composition of claim 1 in which the bis-(trialkylsilyl)-acid amide is bis-(trimethylsilyl)-acetamide.

5. A composition of claim 1 in which the tin salt is dibutyl tin dilaurate.

6. A composition of claim 1 in which the fluid organohydrogenpolysiloxane is present in an amount equal to 100 parts by weight, the bis-(trialkylsilyl)-acid amide is present in an amount equal to from 1 to 10 parts by weight, and the tin salt is present in an amount equal to from 0.1 to 10 parts by weight.

7. A composition of claim 6 in which the organohydrogenpolysiloxane is a methylhydrogenpolysiloxane, the acid amide is bis-(trimethylsilyl)-acetamide and the tin salt is dibutyl tin dilaurate.

References Cited

UNITED STATES PATENTS

| 3,284,485 | 11/1966 | Goossens | 260—2.5 |
| 3,364,160 | 1/1968 | Golitz et al. | 260—46.5 |
| 3,379,659 | 4/1968 | Murphy | 260—2.5 |

OTHER REFERENCES

Journal of the American Chemical Society, Klebe et al., vol. 88 (3390), 1966.

JOHN C. BLEUTGE, Primary Examiner

U.S. Cl. X.R.

260—18, 37, 46.5